United States Patent
Sato et al.

(10) Patent No.: US 10,448,651 B2
(45) Date of Patent: Oct. 22, 2019

(54) BAKED CONFECTIONERY

(71) Applicant: KAO CORPORATION, Tokyo (JP)

(72) Inventors: Mioto Sato, Kita-ku (JP); Yuuki Ishida, Mishima (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 14/655,959

(22) PCT Filed: Dec. 26, 2013

(86) PCT No.: PCT/JP2013/084995
§ 371 (c)(1),
(2) Date: Jun. 26, 2015

(87) PCT Pub. No.: WO2014/104251
PCT Pub. Date: Jul. 3, 2014

(65) Prior Publication Data
US 2015/0335036 A1    Nov. 26, 2015

(30) Foreign Application Priority Data
Dec. 28, 2012 (JP) .................................. 2012-288635

(51) Int. Cl.
| | | |
|---|---|---|
| *A21D 2/18* | (2006.01) | |
| *A21D 2/16* | (2006.01) | |
| *A21D 13/02* | (2006.01) | |
| *A21D 2/36* | (2006.01) | |
| *A21D 13/04* | (2017.01) | |

(52) U.S. Cl.
CPC ............... *A21D 2/18* (2013.01); *A21D 2/16* (2013.01); *A21D 2/165* (2013.01); *A21D 2/36* (2013.01); *A21D 13/02* (2013.01); *A21D 13/04* (2013.01)

(58) Field of Classification Search
CPC . A21D 2/16; A21D 13/02; A21D 2/18; A21D 13/04; A21D 13/08; A21D 2/36; A21D 2/165
USPC ................................................. 426/553, 556
See application file for complete search history.

(56) References Cited

U.S. PATENT DOCUMENTS

| | | |
|---|---|---|
| 2009/0053379 A1 | 2/2009 | Kimura et al. |
| 2009/0169698 A1 | 7/2009 | Kameo et al. |

FOREIGN PATENT DOCUMENTS

| | | | |
|---|---|---|---|
| JP | 11 75746 | | 3/1999 |
| JP | 2004298179 A | * | 10/2004 |
| JP | 3741525 | | 2/2006 |
| JP | 2006 166909 | | 6/2006 |
| JP | 2008-125492 A | | 6/2008 |
| JP | 2014 140363 | | 8/2014 |

OTHER PUBLICATIONS

Devi et al. J Food Sci Technol (Oct. 2016) 53(10):3633-3641.*
International Search Report dated Apr. 1, 2014 in PCT/JP2013/084995 filed Dec. 26, 2013.
U.S. Appl. No. 14/655,959, filed Jun. 26, 2015, Sato, et al.
U.S. Appl. No. 14/655,852, filed Jun. 26, 2015, Sato, et al.
Kanikoron. 'Sakuhoro cookie of the rye graham flour'. Cookpad Recipe 950262, Oct. 29, 2009. Retrieved from: Cookpad on Jul. 6, 2017. [online] <Internet URL: http://cookpad.com/recipe/950262> (w/ partial English translation).
'Crunchy okara bean curd refuse/okara cookies'. Cookpad Recipe 679038, Feb. 10, 2009. Retrieved from: Cookpad on Jul. 6, 2017. [online] <Internet URL: http://cookpad.com/recipe/679038> (w/ partial English translation).

* cited by examiner

*Primary Examiner* — Subbalakshmi Prakash
(74) *Attorney, Agent, or Firm* — Oblon, McClelland, Maier & Neustadt, L.L.P.

(57) ABSTRACT

Baked confectionery containing fat and oil having a melting point of 20° C. or lower and fat and oil having a melting point of from 25 to 50° C. in a total amount of 20 to 65 parts by mass, with respect to 100 parts by mass of a total amount of wheat flour and insoluble dietary fiber-containing powder, and satisfying the following (a) to (c):

(a) a ratio of a content B of the wheat flour to a content A of the insoluble dietary fiber-containing powder satisfies B/A=50/50 to 80/20 in terms of a mass ratio;
(b) a ratio of a content D of the fat and oil having the melting point of 20° C. or lower to a content C of the fat and oil having the melting point of from 25 to 50° C. satisfies D/C=1/7 to 7/1 in terms of a mass ratio; and
(c) a gliadin content is 2.4 mass % or more.

13 Claims, No Drawings

BAKED CONFECTIONERY

FIELD OF THE INVENTION

The present invention relates to baked confectionery rich in insoluble dietary fiber.

BACKGROUND OF THE INVENTION

Wheat-variety hull, also called bran, is attracting attention as a material of health foods, since it is rich in insoluble dietary fiber, vitamins, minerals and the like. Whole wheat flour obtained by milling whole wheat grains including their hulls is reported to have a hypotensive effect and an abdominal fat reducing effect, and also reported to reduce risk of mortality of diabetic patients.

In baked confectionery made from wheat flour as a main ingredient, such as cookies, biscuits and low-calorie snack bars, soft and smooth food texture is generally favored. On the other hand, when attempts were made to enhance health functionality by blending a powder rich in insoluble dietary fiber, such as bran, into dough prepared using wheat flour, the food texture of the baked confectionery obtained by baking the dough becomes hard and also increased in roughness and foreign taste, so that baked confectionery having preferred taste could not be obtained.

SUMMARY OF THE INVENTION

The present invention provides baked confectionery containing fat and oil having a melting point of 20° C. or lower and fat and oil having a melting point of from 25 to 50° C. in a total amount of 20 to 65 parts by mass, with respect to 100 parts by mass of a total amount of wheat flour and insoluble dietary fiber-containing powder, and satisfying the following (a) to (c):

(a) a ratio of a content B of the wheat flour to a content A of the insoluble dietary fiber-containing powder satisfies B/A=50/50 to 80/20 in terms of a mass ratio;

(b) a ratio of a content D of the fat and oil having the melting point of 20° C. or lower to a content C of the fat and oil having the melting point of from 25 to 50° C. satisfies D/C=1/7 to 7/1 in terms of a mass ratio; and (c) a gliadin content is 2.4 mass % or more.

Further, the present invention provides a method of producing baked confectionery, including preparing dough by blending therein at least wheat flour, insoluble dietary fiber-containing powder, fat and oil having a melting point of 20° C. or lower and fat and oil having a melting point of from 25 to 50° C. so as to satisfy (d) to (g) below, and baking the dough:

(d) a ratio of a blending amount B' of the wheat flour to a blending amount A' of the insoluble dietary fiber-containing powder satisfies B'/A'=50/50 to 80/20 in terms of a mass ratio;

(e) a ratio of a blending amount D' of the fat and oil having the melting point of 20° C. or lower to a blending amount C' of the fat and oil having the melting point of from 25 to 50° C. satisfies D'/C'=1/7 to 7/1 in terms of a mass ratio;

(f) a total blending amount of the fat and oil having the melting point of 20° C. or lower and the fat and oil having the melting point of from 25 to 50° C. is 20 to 65 parts by mass, with respect to 100 parts by mass of a total blending amount of the wheat flour and the insoluble dietary fiber-containing powder; and (g) a gliadin content in the dough is 2.0 mass % or more.

Other and further objects, features and advantages of the invention will appear more fully from the following description.

DETAILED DESCRIPTION OF THE INVENTION

The present invention is contemplated for providing baked confectionery which contains wheat flour as a main ingredient, has softer and smoother food texture and is excellent in both flavor and sweetness, even though the baked confectionery abundantly contains insoluble dietary fiber.

The present inventor found that, even when baked confectionery is prepared from dough rich in insoluble dietary fiber together with wheat flour, it is possible by blending a specific amount of a specific fat and oil into the dough to obtain, by baking the dough, the baked confectionery that is softer in food texture, and reduced in texture roughness and foreign taste originating from the insoluble-dietary-fiber raw material or the like, and further that the sweetness of the confectionery is favorably brought out. The present invention has been completed based on these findings.

The baked confectionery of the present invention is described in detail below.

In the present invention, "baked confectionery" means a biscuit, a cookie, a cracker, a hardtack, a pretzel, a pie, cut bread, shortbread, or the like as described in "Seikajiten (Confectionery Dictionary)," the first edition, Oct. 30, 1981, p. 204. For example, the baked confectionery includes a biscuit, a cookie, a cracker, a hardtack, a pretzel, a pie, cut bread, and the like specified in the Fair Competition Code in 1971. The baked confectionery of the present invention is preferably a cookie, a biscuit, shortbread or a cracker.

More specifically, in the present invention, "baked confectionery" means a product that is different from bread prepared by baking dough after many gas bubbles are incorporated therein by fermenting the dough with yeast, and also different from cake prepared by baking dough after many gas bubbles are incorporated therein by adding baking powder, meringue or the like to the dough, although the baked confectionery is obtained by baking dough containing farina, and fat and oil "Baked confectionery" of the present invention contains a smaller amount of gas bubbles, and has lower elasticity, higher penetration strength, a lower moisture content, and also lower water activity in comparison with the bread and the cake.

The baked confectionery of the present invention contains a specific amount of the wheat flour. The wheat flour used in the present invention is not particularly limited, as long as the wheat flour is obtained by milling albumen of wheat, and for example, one kind or two or more kinds selected from strong flour, medium-strength flour and weak flour can be used. Above all, medium-strength flour, weak flour, or medium-strength flour and weak flour are preferably used, and weak flour is further preferably used. A commercial item can be used as the wheat flour. Moreover, the wheat flour used in the present invention is preferably one produced from soft wheat. Wheat used as the raw material preferably includes western white wheat or white club wheat.

Moreover, the baked confectionery of the present invention contains a specific amount of insoluble dietary fiber-containing powder. The insoluble dietary fiber-containing powder means a powder preparation highly containing the insoluble dietary fiber, and the powder preparation containing the insoluble dietary fiber in an amount of preferably 10 mass % or more, more preferably 20 mass % or more, more preferably 30 mass % or more, more preferably 40 mass % or more. The insoluble dietary fiber-containing powder is not particularly limited and specific examples include one kind or two or more kinds selected from a cellulose preparation, a crystalline cellulose preparation, a methylcellulose preparation, a hemicellulose preparation, a preparation obtained by powdering hulls of grain seeds, a soybean pulp left after extracting soybean milk from a soybean, a preparation obtained by powdering crustacea shells, and a preparation obtained by powdering cell walls of fungi. Specific examples of the preparation obtained by powdering the crustacea shells include a preparation containing chitin or chitosan. The above-described insoluble dietary fiber-containing powder preferably contains the preparation obtained by powdering the hulls of grain seeds. Above all, the insoluble dietary fiber-containing powder more preferably contains bran derived from wheat variety, and more preferably contains wheat bran.

In the present specification, the word "bran" is used in broad sense, and includes hulls of wheat, and also hulls of wheat variety other than the wheat.

Specific examples of the above-described wheat variety include wheat, barley, rye and oats.

When the above-described insoluble dietary fiber-containing powder contains the bran derived from wheat variety, a ratio of the bran derived from wheat variety in the insoluble dietary fiber-containing powder is preferably 50 mass % or more, more preferably 70 mass % or more, more preferably from 80 to 100 mass %, more preferably from 90 to 100 mass %, more preferably 100 mass %. Namely, the above-described insoluble dietary fiber-containing powder is preferably composed of the bran derived from wheat variety.

Moreover, the above-described bran derived from wheat variety in the above-described insoluble dietary fiber-containing powder preferably contains the wheat bran, and a ratio of the wheat bran in the bran derived from wheat variety is preferably 50 mass % or more, more preferably 70 mass % or more, more preferably from 80 to 100 mass %, more preferably from 90 to 100 mass %, more preferably 100 mass %. Namely, the above-described insoluble dietary fiber-containing powder is further preferably composed of the wheat bran.

In the present invention, wheat flour is not contained in "insoluble dietary fiber-containing powder".

In the baked confectionery of the present invention, a ratio of a content of the wheat flour to a content of the insoluble dietary fiber-containing powder ([content of wheat flour]/[content of insoluble dietary fiber-containing powder]) is from 50/50 to 80/20 in terms of a mass ratio, and from the viewpoints of satisfying both food texture and physiological effects, the ratio is preferably from 55/45 to 80/20, and further preferably from 60/40 to 70/30 in terms of a mass ratio.

The baked confectionery of the present invention contains the wheat flour and the insoluble dietary fiber-containing powder in a total amount of preferably from 30 to 80 mass %, more preferably from 40 to 75 mass %, more preferably from 50 to 70 mass %.

Moreover, from the viewpoints of physiological effects, the baked confectionery of the present invention contains the insoluble dietary fiber in an amount of preferably 2.5 mass % or more, more preferably 3 mass % or more, more preferably 5 mass % or more. Moreover, from the viewpoint of the food texture, a content of the insoluble dietary fiber in the baked confectionery is preferably 30 mass % or less, more preferably 20 mass % or less, more preferably 15 mass % or less, more preferably 10 mass % or less. From the viewpoint of satisfying both the food texture and the physiological effects, the baked confectionery of the present invention contains the insoluble dietary fiber in an amount of preferably from 2.5 to 30 mass %, more preferably from 3 to 20 mass %, more preferably from 5 to 15 mass %, more preferably from 5 to 10 mass %.

The baked confectionery of the present invention contains fat and oil. The fat and oil contained in the baked confectionery of the present invention is described below.

The baked confectionery of the present invention contains one kind or two or more kinds of fat and oil having a melting point of 20° C. or lower. The fat and oil is not particularly limited, as long as the melting point thereof is 20° C. or lower, and specific examples thereof include soybean oil, canola oil, rapeseed oil, rice oil, corn oil, cotton seed oil, sesame oil, safflower oil, sunflower oil, olive oil, macadamia nut oil, hazelnut oil, pumpkin seed oil, walnut oil, camellia oil, tea seed oil, perilla oil, mustard oil, rice bran oil, wheat malt oil, sunflower oil, fish oil, fractionated oil thereof, transesterified oil thereof and mixed fat and oil thereof. From the viewpoint of flavor, one kind or two or more kinds selected from the group consisting of soybean oil, canola oil, rapeseed oil, rice bran oil, corn oil, cotton seed oil, sesame oil, safflower oil, sunflower oil and olive oil are preferred, and one kind or two kinds selected from the group consisting of rapeseed oil and rice bran oil are further preferred. Moreover, purified or partially purified monoacylglycerol (monoglyceride), diacylglycerol (diglyceride), triacylglycerol (triglyceride) or the like may be contained.

In the above-described fat and oil having the melting point of 20° C. or lower, the melting point is preferably 10° C. or lower, more preferably 4° C. or lower.

Moreover, the baked confectionery of the present invention contains one kind or two or more kinds of fat and oil having a melting point of from 25 to 50° C. The fat and oil is not particularly limited, as long as the melting point thereof is from 25 to 50° C., but preferably has plasticity, and for example, emulsified fat and oil such as butter, margarine and fat spread; shortening; lard; or the like can be preferably used. From the viewpoint of the flavor, the emulsified fat and oil is preferred, one kind or two or more kinds selected from the group consisting of butter, margarine and fat spread are more preferred, and one kind or two or more kinds selected from the group consisting of butter and margarine are more preferred.

In the above-described fat and oil having the melting point of from 25 to 50° C., the melting point is preferably from 25 to 45° C., more preferably from 25 to 40° C.

The above-described fat and oil having the melting point of from 25 to 50° C. need to have foaming ability in a sugar batter method or the like ordinarily applied in a method of producing the baked confectionery. Accordingly, a ratio of saturated fatty acid in whole constituent fatty acid of the above-described fat and oil having the melting point of from 25 to 50° C. is preferably 25 mass % or more, more preferably 30 mass % or more. Moreover, from the viewpoint of dispersibility of the fat and oil into the dough, the ratio of the saturated fatty acid in the whole constituent fatty acid of the fat and oil having the melting point of from 25 to 50° C. is preferably 45 mass % or less, more preferably 35 mass % or less. Specific examples of the above-described saturated fatty acid include one kind or two or more kinds selected from lauric acid, myristic acid, palmitic acid, stearic acid, arachic acid and behenic acid. From the viewpoints of the flavor and the food texture, in the above-described fat and oil having the melting point of from 25 to 50° C., a ratio of palmitic acid in the whole constituent fatty acid is preferably from 10 to 20 mass %, and a ratio of stearic acid in the whole constituent fatty acid is preferably from 5 to 20 mass %.

In the baked confectionery of the present invention, a ratio of a content of the above-described fat and oil having the melting point of 20° C. or lower to a content of the above-described fat and oil having the melting point of from 25 to 50° C. ([content of fat and oil having a melting point of 20° C. or lower]/[content of fat and oil having a melting point of from 25 to 50° C.]) is from 1/7 to 7/1 in terms of a mass ratio, and from the viewpoint of food texture, the ratio is preferably from 1/5 to 7/1, more preferably from 1/3 to 5/1 in terms of a mass ratio. If the mass ratio exceeds 7/1, when an egg is used as a raw material of the baked confectionery, homogeneous dough is hard to obtain.

In the baked confectionery of the present invention, when a total content of the above-described wheat flour and the above-described insoluble dietary fiber-containing powder is taken as 100 parts by mass, a total content of the above-described fat and oil having the melting point of 20° C. or lower and the above-described fat and oil having the melting point of from 25 to 50° C. is from 20 to 65 parts by mass, and from the viewpoint of food texture, preferably from 20 to 60 parts by mass, more preferably from 30 to 60 parts by mass.

From the viewpoint of the food texture, a ratio of unsaturated fatty acid in the whole fatty acid constituting total fat and oil including both the above-described fat and oil having the melting point of 20° C. or lower and the above-described fat and oil having the melting point of from 25 to 50° C. is preferably 42 mass % or more, more preferably 44 mass % or more, more preferably 49 mass % or more. Moreover, from the similar viewpoint, the ratio of the unsaturated fatty acid in the whole fatty acid constituting the total fat and oil including both the above-described fat and oil having the melting point of 20° C. or lower and the above-described fat and oil having the melting point of from 25 to 50° C. is preferably 86 mass % or less, more preferably 84 mass % or less, more preferably 82 mass % or less. Here, specific examples of the unsaturated fatty acid include myristoleic acid, pentadecene acid, palmitoleic acid, margaroleic acid, oleic acid, linolic acid, linoleic acid, gadoleic acid, eicosadienoic acid, arachidonic acid, erucic acid and docosadienoic acid.

In the present invention, the melting point of the fat and oil is a boundary temperature point at which all of solid fat melt. A solid fat content in the fat and oil can be measured according to the method described in 2.2.9 Solid Fat Content (NMR method) in the Standard Methods for the Analysis of Fats, Oils and Related Materials established by Japan Oil Chemists' Society.

In the baked confectionery of the present invention, the total content of the above-described fat and oil having the melting point of 20° C. or lower and the above-described fat and oil having the melting point of from 25 to 50° C. is preferably from 12 to 40 mass %, more preferably from 15 to 37 mass %, more preferably from 18 to 35 mass %. Moreover, from the viewpoint of food texture, in the baked confectionery of the present invention, the content of the above-described fat and oil having the melting point of 20° C. or lower is preferably 1.5 mass % or more, more preferably 2 mass % or more, more preferably 3 mass % or more, more preferably 5 mass % or more, more preferably 7.5 mass % or more, more preferably 10 mass % or more. Moreover, from the viewpoint of flavor, the content of the above-described fat and oil having the melting point of 20° C. or lower is preferably 35 mass % or less, more preferably 33 mass % or less, more preferably 30 mass % or less, more preferably 28 mass % or less, more preferably 25 mass % or less. From the viewpoint of satisfying both food texture and flavor, the content of the above-described fat and oil having the melting point of 20° C. or lower is preferably from 1.5 to 35 mass %, more preferably from 3 to 33 mass %, more preferably from 5 to 30 mass %, more preferably from 7.5 to 28 mass %, more preferably from 10 mass % to 25 mass %.

In the baked confectionery of the present invention, within the range in which effects of the present invention is not adversely affected, fat and oil having a melting point exceeding 50° C. may be contained, but ordinarily, the fat and oil in the baked confectionery of the present invention are composed of the above-described fat and oil having the melting point of 20° C. or lower and the above-described fat and oil having the melting point of from 25 to 50° C.

In the baked confectionery of the present invention, a gliadin content is 2.4 mass % or more. From the viewpoint of suppressing the rough food texture and the foreign taste originating from the insoluble dietary fiber-containing powder or the like, the gliadin content in the baked confectionery of the present invention is preferably 2.7 mass % or more, more preferably 3.0 mass % or more, more preferably 3.2 mass % or more. Moreover, from the viewpoint of the food texture and food taste, the gliadin content in the baked confectionery of the present invention is preferably 4.3 mass % or less, more preferably 4.1 mass % or less. From the viewpoints of suppressing rough food texture and foreign taste originating from the insoluble dietary fiber-containing powder or the like, together with satisfying food taste, the gliadin content in the baked confectionery of the present invention is preferably from 2.4 to 4.3 mass %, more preferably from 2.7 to 4.3 mass %, more preferably from 3.0 to 4.3 mass %, more preferably from 3.2 to 4.3 mass %, more preferably from 3.2 to 4.1 mass %.

The baked confectionery of the present invention may contain, in addition to the wheat flour, the insoluble dietary fiber-containing powder and the fat and oil described above, any other ingredient originating from the raw material that can be blended in in the preparation of the dough, or any other ingredient originating from various condiments to be added after baking the dough. Specific examples of origins of other ingredients include one kind or two or more kinds selected from a saccharide, syrup, dried milk, milk, coconut milk, an egg, starch, kitchen salt, powder, a condiment, a sweetener, baking powder, a pH adjuster, an antioxidant, a flavoring agent and water.

From the viewpoint of storage stability, a moisture content (water content) in the baked confectionery of the present invention is preferably 20 mass % or less, more preferably 15 mass % or less, more preferably 10 mass % or less. Moreover, from the viewpoint of food texture, the moisture content in the baked confectionery of the present invention is preferably 5 mass % or more, more preferably 6 mass % or more. More specifically, the moisture content in the baked confectionery of the present invention is preferably from 5 to 20 mass %, more preferably from 5 to 15 mass %, more preferably from 6 to 10 mass %.

From the viewpoint of storage stability, water activity in the baked confectionery of the present invention is preferably 0.8 or less, more preferably 0.7 or less, more preferably 0.6 or less.

The baked confectionery of the present invention contains the wheat flour as a main ingredient, wherein the baked confectionery has softer and smoother food texture, and is excellent in flavor, and further, sweetness thereof is favorably sensed, even though the baked confectionery abundantly contains the insoluble dietary fiber.

A method of producing the baked confectionery of the present invention (hereinafter, referred to as "production method of the present invention") is described below.

The baked confectionery of the present invention is obtainable by baking the dough prepared by blending therein, as the main materials, specific amounts of the wheat flour, the insoluble dietary fiber-containing powder, the fat and oil having the melting point of 20° C. or lower and the fat and oil having the melting point of from 25 to 50° C., and when necessary, blending therein specific amounts of the saccharide, the egg or the like.

The wheat flour, the insoluble dietary fiber-containing powder, the fat and oil having the melting point of 20° C. or lower and the fat and oil having the melting point of from 25 to 50° C. are the same as those described in the above-mentioned baked confectionery of the present invention.

In the preparation of the dough in the production method of the present invention, a ratio of a blending amount of the wheat flour to a blending amount of the insoluble dietary fiber-containing powder ([blending amount of the wheat flour]/[blending amount of the insoluble dietary fiber-containing powder]) is from 50/50 to 80/20 in terms of a mass ratio, and from the viewpoint of satisfying both food texture and physiological effects, the ratio is preferably from 55/45 to 80/20, more preferably from 60/40 to 70/30 in terms of a mass ratio.

Moreover, in the preparation of the dough in the production method of the present invention, a ratio of a blending amount of the fat and oil having the melting point of 20° C. or lower to a blending amount of the fat and oil having the melting point of from 25 to 50° C. ([blending amount of the fat and oil having the melting point of 20° C. or lower]/[blending amount of the fat and oil having the melting point of from 25 to 50° C.]) is from 1/7 to 7/1 in terms of a mass ratio, and from the viewpoint of the food texture, the ratio is preferably from 1/5 to 7/1, more preferably from 1/3 to 5/1 in terms of a mass ratio. If the mass ratio exceeds 7/1, when the egg is mixed in the dough, the homogeneous dough is hard to obtain.

Moreover, in the preparation of the dough in the production method of the present invention, with respect to 100 parts by mass of a total blending amount of the wheat flour and the insoluble dietary fiber-containing powder, a total blending amount of the fat and oil having the melting point of 20° C. or lower and the fat and oil having the melting point of from 25 to 50° C. is from 20 to 65 parts by mass, and from the viewpoint of the food texture, preferably from 20 to 60 parts by mass, more preferably from 30 to 60 parts by mass.

In the preparation of the dough in the production method of the present invention, within the range in which the effects of the invention is not adversely affected, the fat and oil having the melting point exceeding 50° C. may be blended in, but such fat and oil are not ordinarily blended in.

In the production method of the present invention, a saccharide is preferably blended in the dough.

The baked confectionery of the present invention preferably contains a saccharide. The saccharide is not particularly limited, and specific examples include one kind or two or more kinds selected from a monosaccharide, a disaccharide, a trisaccharide, a tetrasaccharide, a pentasaccharide, a hexasaccharide, a starch hydrolysate, and sugar alcohol obtained by reducing these materials. More specifically, specific examples include one kind or two or more kinds selected from glucose, maltose, fructose, sucrose, lactose, trehalose, maltotriose, maltotetraose, sorbitol, xylitol, erythritol, maltitol, starch syrup, high-fructose corn syrup, invert sugar, cyclodextrin, dextrin, and branched cyclodextrin.

With respect to 100 parts by mass of a total blending amount of the wheat flour and the insoluble dietary fiber-containing powder, an amount of the saccharide blended in the dough is from 1 to 50 parts by mass, preferably from 1 to 30 parts by mass, more preferably from 1 to 20 parts by mass.

In the production method of the present invention, the egg is preferably blended in the dough. The egg is not particularly limited, and a hen's egg, an ostrich's egg, a duck's egg or the like can be used, and above all, a hen's egg is preferably used. The above-described egg means egg white or egg york, or egg white and egg york.

A form of processing the egg to be used is not particularly limited. For example, one kind or two or more kinds selected from a raw egg, a frozen egg, a powdered egg, a sugar-added egg, and a pasteurized egg can be used, and above all, a pasteurized egg is preferably used.

An amount of the egg blended in the dough is preferably from 5 to 50 parts by mass, more preferably from 5 to 30 parts by mass, more preferably from 5 to 20 parts by mass, with respect to 100 parts by mass of a total blending amount of the wheat flour and the insoluble dietary fiber-containing powder.

Moreover, in the production method of the present invention, milk powder, skimmed milk powder, milk, coconut milk, maple syrup, almond powder, kitchen salt, various condiments, various sweeteners, baking powder, a pH adjuster, an antioxidant, a flavoring agent, water or the like may be blended in the dough. Blending amounts of these materials are preferably within the range of blending amounts in ordinary preparation of the baked confectionery.

In the above-described preparation of the dough, an ordinary method such as a sugar batter method and a flour batter method can be employed. Moreover, such a method can also be employed as hard biscuit cutting, soft biscuit cutting (embossing), biscuit rotary cutting, biscuit wire cutting, biscuit route press, biscuit depositing (drops) and hand-made biscuit.

In the production method of the present invention, from the viewpoints of physiological effects, a content of the insoluble dietary fiber in the dough prepared is preferably 2.2 mass % or more, more preferably 2.5 mass % or more, more preferably 4.5 mass % or more. From the viewpoint of food texture, the content of the insoluble dietary fiber in the dough prepared is preferably 25 mass % or less, more preferably 17 mass % or less, more preferably 13 mass % or less, more preferably 9 mass % or less. From the viewpoints of food texture together with physiological effects, the content of the insoluble dietary fiber in the dough prepared is preferably from 2.2 to 25 mass %, more preferably from 2.5 to 17 mass %, more preferably from 4.5 to 13 mass %, more preferably from 4.5 to 9 mass %.

In the production method of the present invention, a total content of the fat and oil in the dough prepared is preferably from 11 to 35 mass %, more preferably from 12 to 32 mass %, more preferably from 13 to 30 mass %.

Moreover, in the production method of the present invention, from the viewpoint of food texture, a content of the fat and oil having the melting point of 20° C. or lower in the dough prepared is preferably 1.3 mass % or more, more preferably 1.5 mass % or more, more preferably 2.5 mass % or more, more preferably 4 mass % or more, more preferably 6.5 mass % or more, more preferably 9 mass % or more.

Moreover, from the viewpoint of flavor, the content of the above-described fat and oil having the melting point of 20° C. or lower is preferably 30 mass % or less, more preferably 27 mass % or less, more preferably 25 mass % or less, more preferably 23 mass % or less, more preferably 21 mass % or less. From the viewpoints of food texture and flavor, the content of the above-described fat and oil having the melting point of 20° C. or lower in the dough prepared is preferably from 1.3 to 30 mass %, more preferably from 2.5 to 27 mass %, more preferably from 4 to 25 mass %, more preferably from 6.5 to 23 mass %, more preferably from 9 to 21 mass %.

In the production method of the present invention, from the viewpoint of food texture, a ratio of the unsaturated fatty acid in the whole fatty acid constituting the total fat and oil in the dough prepared is preferably 42 mass % or more, more preferably 44 mass % or more, more preferably 49 mass % or more. Moreover, from the similar viewpoint, the ratio of the unsaturated fatty acid in the whole fatty acid constituting the total fat and oil in the dough prepared is preferably 86 mass % or less, more preferably 84 mass % or less, more preferably 82 mass % or less. Here, specific examples of the unsaturated fatty acid include myristoleic acid, pentadecene acid, palmitoleic acid, margaroleic acid, oleic acid, linolic acid, linoleic acid, gadoleic acid, eicosadienoic acid, arachidonic acid, erucic acid and docosadienoic acid.

The baked confectionery obtained by the production method of the present invention contains a fixed amount or more of gliadin. The gliadin is a gluten precursor, together with glutenin. If water is added to grain powder containing the gliadin and the glutenin, such as wheat flour, the gliadin and the glutenin are entangled and gluten is formed.

In the production method of the present invention, the gliadin content in the dough prepared is 2.0 mass % or more. In the baked confectionery produced, from the viewpoints of suppressing rough food texture and foreign taste originating from the insoluble dietary fiber-containing powder or the like, the gliadin content in the dough prepared is preferably 2.3 mass % or more, more preferably 2.7 mass % or more, more preferably 2.9 mass % or more. Moreover, from the viewpoints of food texture and food taste of the baked confectionery produced, the gliadin content in the dough prepared is preferably 4.0 mass % or less, more preferably 3.7 mass % or less. From the viewpoints of the suppression of rough food texture and foreign taste originating from the insoluble dietary fiber-containing powder or the like, together with satisfying food taste, the gliadin content in the dough prepared is preferably from 2.3 to 4.0 mass %, more preferably from 2.7 to 3.7 mass %, more preferably from 2.9 to 3.7 mass %. In the present invention, the gliadin content can be measured according to the method described in Examples shown later.

The production method of the present invention includes baking the dough prepared as described above. The baked confectionery of the present invention may be obtained by baking the dough. Baking conditions are not particularly limited, and can be appropriately determined according to kinds of baked confectionery.

Under ordinary baking conditions, from 50 to 90 mass % of the moisture contained in the dough is lost. Accordingly, a content of a non-volatile ingredient contained in the above-described raw materials blended in the dough increases according to a lost moisture content in the baked confectionery after being baked.

With regard to the above-mentioned embodiment, the present invention discloses the baked confectionery or the method of producing the baked confectionery shown below.

<1>
Baked confectionery containing fat and oil having a melting point of 20° C. or lower and fat and oil having a melting point of from 25 to 50° C. in a total amount of 20 to 65 parts by mass, with respect to 100 parts by mass of a total amount of wheat flour and insoluble dietary fiber-containing powder, and satisfying the following (a) to (c):

(a) a ratio of a content B of the wheat flour to a content A of the insoluble dietary fiber-containing powder satisfies B/A=50/50 to 80/20 in terms of a mass ratio;

(b) a ratio of a content D of the fat and oil having the melting point of 20° C. or lower to a content C of the fat and oil having the melting point of from 25 to 50° C. satisfies D/C=1/7 to 7/1 in terms of a mass ratio; and (c) a gliadin content is 2.4 mass % or more.
<2>
The baked confectionery according to the item <1>, wherein the insoluble dietary fiber-containing powder contains insoluble dietary fiber in an amount of preferably 10 mass % or more, more preferably 20 mass % or more, more preferably 30 mass % or more, more preferably 40 mass % or more.
<3>
The baked confectionery according to the item <1> or <2>, wherein the insoluble dietary fiber-containing powder is preferably composed of one kind or two or more kinds selected from a cellulose preparation, a crystalline cellulose preparation, a methylcellulose preparation, a hemicellulose preparation, a preparation obtained by powdering hulls of grain seeds, a soybean pulp left after extracting soybean milk from a soybean, a preparation obtained by powdering shells of crustacea, and a preparation obtained by powdering cell walls of fungi, more preferably contains a preparation obtained by powdering hulls of grain seeds, more preferably contains bran derived from wheat variety, more preferably contains wheat bran.
<4>
The baked confectionery according to the item <3>, wherein the insoluble dietary fiber-containing powder contains the bran derived from wheat variety in an amount of preferably 50 mass % or more, more preferably 70 mass % or more, more preferably from 80 to 100 mass %, more preferably from 90 to 100 mass %, more preferably 100 mass %.
<5>
The baked confectionery according to the item <3> or <4>, wherein a ratio of the wheat bran in the bran derived from wheat variety is preferably 50 mass % or more, more preferably 70 mass % or more, more preferably from 80 to 100 mass %, more preferably from 90 to 100 mass %, more preferably 100 mass %.
<6>
The baked confectionery according to any one of the items <1> to <5>, wherein the B/A is preferably from 55/45 to 80/20, more preferably from 60/40 to 70/30.
<7>
The baked confectionery according to any one of the items <1> to <6>, wherein a total content of the wheat flour and the insoluble dietary fiber-containing powder in the baked confectionery is preferably from 30 to 80 mass %, more preferably from 40 to 75 mass %, more preferably from 50 to 70 mass %.
<8>
The baked confectionery according to any one of the items <1> to <7>, wherein a content of the insoluble dietary fiber in the baked confectionery is preferably 2.5 mass % or more, more preferably 3 mass % or more, more preferably 5 mass % or more.

<9>
The baked confectionery according to any one of the items <1> to <8>, wherein a content of the insoluble dietary fiber in the baked confectionery is preferably 30 mass % or less, more preferably 20 mass % or less, more preferably 15 mass % or less, more preferably 10 mass % or less.

<10>
The baked confectionery according to any one of the items <1> to <7>, wherein a content of the insoluble dietary fiber in the baked confectionery is preferably from 2.5 to 30 mass %, more preferably from 3 to 20 mass %, more preferably from 5 to 15 mass %, more preferably from 5 to 10 mass %.

<11>
The baked confectionery according to any one of the items <1> to <10>, wherein the fat and oil having the melting point of 20° C. or lower is preferably one kind or two or more kinds selected from the group consisting of soybean oil, canola oil, rapeseed oil, rice oil, corn oil, cotton seed oil, sesame oil, safflower oil, sunflower oil, olive oil, macadamia nut oil, hazelnut oil, pumpkin seed oil, walnut oil, camellia oil, tea seed oil, perilla oil, mustard oil, rice bran oil, wheat malt oil, sunflower oil and fish oil, more preferably one kind or two or more kinds selected from the group consisting of soybean oil, canola oil, rapeseed oil, rice oil, corn oil, cotton seed oil, sesame oil, safflower oil, sunflower oil and olive oil, more preferably one kind or two or more kinds selected from the group consisting of rapeseed oil and rice oil.

<12>
The baked confectionery according to any one of the items <1> to <11>, wherein a melting point of the fat and oil having the melting point of 20° C. or lower is preferably 10° C. or lower, more preferably 4° C. or lower.

<13>
The baked confectionery according to any one of the items <1> to <12>, wherein the fat and oil having the melting point of 25° C. to 50° C. is preferably fat and oil having plasticity, more preferably one kind or two or more kinds selected from the group consisting of emulsified fat and oil such as butter, margarine and fat spread, shortening and lard, more preferably emulsified fat and oil, more preferably water-in-oil emulsified fat and oil, more preferably one kind or two or more kinds selected from butter, margarine and fat spread, more preferably one kind or two or more kinds selected from margarine and butter.

<14>
The baked confectionery according to any one of the items <1> to <13>, wherein a ratio of saturated fatty acid in whole constituent fatty acid of the fat and oil having the melting point of from 25 to 50° C. is preferably 25 mass % or more, more preferably 30 mass % or more.

<15>
The baked confectionery according to any one of the items <1> to <14>, wherein a ratio of saturated fatty acid in whole constituent fatty acid of the fat and oil having the melting point of from 25 to 50° C. is preferably 45 mass % or less, more preferably 35 mass % or less.

<16>
The baked confectionery according to any one of the items <1> to <13>, wherein a ratio of saturated fatty acid in whole constituent fatty acid of the fat and oil having the melting point of from 25 to 50° C. is preferably from 25 to 45 mass %, more preferably from 30 to 35 mass %.

<17>
The baked confectionery according to any one of the items <14> to <16>, wherein the saturated fatty acid is preferably one kind or two or more kinds selected from lauric acid, myristic acid, palmitic acid, stearic acid, arachic acid and behenic acid.

<18>
The baked confectionery according to any one of the items <1> to <17>, wherein a ratio of palmitic acid in whole constituent fatty acid of the fat and oil having the melting point of from 25 to 50° C. is preferably from 10 to 20 mass %, and a ratio of stearic acid in the whole constituent fatty acid of the fat and oil having the melting point of from 25 to 50° C. is preferably from 5 to 20 mass %.

<19>
The baked confectionery according to any one of the items <1> to <18>, wherein a melting point of the fat and oil having the melting point of from 25 to 50° C. is preferably from 25 to 45° C., more preferably 25° C. to 40° C.

<20>
The baked confectionery according to any one of the items <1> to <19>, wherein the D/C is preferably from 1/5 to 7/1, more preferably from 1/3 to 5/1.

<21>
The baked confectionery according to any one of the items <1> to <20>, containing the fat and oil having the melting point of 20° C. or lower and the fat and oil having the melting point of from 25 to 50° C. in a total amount of preferably 20 to 60 parts by mass, more preferably 30 to 60 parts by mass, with respect to 100 parts by mass of a total amount of the wheat flour and the insoluble dietary fiber-containing powder.

<22>
The baked confectionery according to any one of the items <1> to <21>, wherein a ratio of unsaturated fatty acid in whole fatty acid constituting total fat and oil composed of the fat and oil having the melting point of 20° C. or lower and the fat and oil having the melting point of from 25 to 50° C. in the baked confectionery is preferably 42 mass % or more, more preferably 44 mass % or more, more preferably 49 mass % or more.

<23>
The baked confectionery according to any one of the items <1> to <22>, wherein a ratio of unsaturated fatty acid in whole fatty acid constituting the total fat and oil composed of the fat and oil having the melting point of 20° C. or lower and the fat and oil having the melting point of from 25 to 50° C. in the baked confectionery is preferably 86 mass % or less, more preferably 84 mass % or less, more preferably 82 mass % or less.

<24>
The baked confectionery according to any one of the items <1> to <21>, wherein a ratio of unsaturated fatty acid in whole fatty acid constituting the total fat and oil composed of the fat and oil having the melting point of 20° C. or lower and the fat and oil having the melting point of from 25 to 50° C. is preferably from 42 to 86 mass %, more preferably from 44 to 84 mass %, more preferably from 49 to 82 mass %.

<25>
The baked confectionery according to any one of the items <22> to <24>, wherein the unsaturated fatty acid is one kind or two or more kinds selected from myristoleic acid, pentadecene acid, palmitoleic acid, margaroleic acid, oleic acid, linolic acid, linoleic acid, gadoleic acid, eicosadienoic acid, arachidonic acid, erucic acid and docosadienoic acid.

<26>
The baked confectionery according to any one of the items <1> to <25>, wherein a total content of the fat and oil having the melting point of 20° C. or lower and the fat and oil having the melting point of from 25 to 50° C. in the baked confectionery is preferably from 12 to 40 mass %, more preferably 15 to 37 mass %, more preferably 18 to 35 mass %.

<27>
The baked confectionery according to any one of the items <1> to <26>, wherein a content of the fat and oil having the melting point of 20° C. or lower in the baked confectionery is preferably 1.5 mass % or more, more preferably 2 mass % or more, more preferably 3 mass % or more, more preferably 5 mass % or more, more preferably 7.5 mass % or more, more preferably 10 mass % or more.

<28>
The baked confectionery according to any one of the items <1> to <27>, wherein a content of the fat and oil having the melting point of 20° C. or lower in the baked confectionery is preferably 35 mass % or less, more preferably 33 mass % or less, more preferably 30 mass % or less, more preferably 28 mass % or less, more preferably 25 mass % or less.

<29>
The baked confectionery according to any one of the items <1> to <26>, wherein a content of the fat and oil having the melting point of 20° C. or lower in the baked confectionery is preferably from 1.5 to 35 mass %, more preferably from 3 to 33 mass %, more preferably from 5 to 30 mass %, more preferably from 7.5 mass % to 28 mass %, more preferably from 10 to 25 mass %.

<30>
The baked confectionery according to any one of the items <1> to <29>, wherein the gliadin content in the baked confectionery is preferably 2.7 mass % or more, more preferably 3.0 mass % or more, more preferably 3.2 mass % or more.

<31>
The baked confectionery according to any one of the items <1> to <30>, wherein the gliadin content in the baked confectionery is preferably 4.3 mass % or less, more preferably 4.1 mass % or less.

<32>
The baked confectionery according to any one of the items <1> to <29>, wherein the gliadin content in the baked confectionery is preferably from 2.4 to 4.3 mass %, more preferably 2.7 to 4.3 mass %, more preferably 3.0 to 4.3 mass %, more preferably 3.2 to 4.3 mass %, more preferably 3.2 to 4.1 mass %.

<33>
The baked confectionery according to any one of the items <1> to <32>, wherein a moisture content in the baked confectionery is preferably 20 mass % or less, more preferably 15 mass % or less, more preferably 10 mass % or less.

<34>
The baked confectionery according to any one of the items <1> to <33>, wherein a moisture content is preferably 5 mass % or more, more preferably 6 mass % or more.

<35>
The baked confectionery according to any one of the items <1> to <32>, wherein a moisture content is preferably from 5 to 20 mass %, more preferably from 5 to 15 mass %, more preferably from 6 to 10 mass %.

<36>
The baked confectionery according to any one of the items <1> to <35>, wherein water activity is preferably 0.8 or less, more preferably 0.7 or less, more preferably 0.6 or less.

<37>
The baked confectionery according to any one of the items <1> to <36>, wherein the baked confectionery is preferably one kind or two or more kinds selected from the group consisting of a biscuit, a cookie, a cracker, a hardtack, a pretzel, a pie, cut bread and shortbread, more preferably one kind or two or more kinds selected from the group consisting of a cookie, a biscuit, shortbread and a cracker.

<38>
A method of producing baked confectionery, including preparing dough by blending therein at least wheat flour, insoluble dietary fiber-containing powder, fat and oil having a melting point of 20° C. or lower and fat and oil having a melting point of from 25 to 50° C. so as to satisfy (d) to (g) below, and baking the dough:
(d) a ratio of a blending amount B' of the wheat flour to a blending amount A' of the insoluble dietary fiber-containing powder satisfies B'/A'=50/50 to 80/20 in terms of a mass ratio;
(e) a ratio of a blending amount D' of the fat and oil having the melting point of 20° C. or lower to a blending amount C' of the fat and oil having the melting point of from 25 to 50° C. satisfies D'/C'=1/7 to 7/1 in terms of a mass ratio;
(f) a total blending amount of the fat and oil having the melting point of 20° C. or lower and the fat and oil having the melting point of from 25 to 50° C. is 20 to 65 parts by mass, with respect to 100 parts by mass of a total blending amount of the wheat flour and the insoluble dietary fiber-containing powder; and
(g) a gliadin content in the dough is 2.0 mass % or more.

<39>
The method of producing the baked confectionery according to the item <38>, wherein the insoluble dietary fiber-containing powder contains insoluble dietary fiber in an amount of preferably 10 mass % or more, more preferably 20 mass % or more, more preferably 30 mass % or more, more preferably 40 mass % or more.

<40>
The method of producing the baked confectionery according to the item <38> or <39>, wherein the insoluble dietary fiber-containing powder is preferably composed of one kind or two or more kinds selected from a cellulose preparation, a crystalline cellulose preparation, a methylcellulose preparation, a hemicellulose preparation, a preparation obtained by powdering hulls of grain seeds, a soybean pulp left after extracting soybean milk from a soybean, a preparation obtained by powdering shells of crustacea, and a preparation obtained by powdering cell walls of fungi, more preferably contains a preparation obtained by powdering hulls of grain seeds, more preferably contains bran derived from wheat variety, more preferably contains wheat bran.

<41>
The method of producing the baked confectionery according to the item <40>, wherein the insoluble dietary fiber-containing powder contains the bran derived from wheat variety in an amount of preferably 50 mass % or more, more preferably 70 mass % or more, more preferably from 80 to 100 mass %, more preferably 90 to 100 mass %, more preferably 100 mass %.

<42>
The method of producing the baked confectionery according to the item <40> or <41>, wherein a ratio of the wheat bran in the bran derived from wheat variety is preferably 50 mass % or more, more preferably 70 mass % or more, more preferably from 80 to 100 mass %, more preferably 90 to 100 mass %, more preferably 100 mass %.

<43>
The method of producing the baked confectionery according to any one of the items <40> to <42>, wherein the B'/A' is preferably from 55/45 to 80/20, more preferably from 60/40 to 70/30.

<44>
The method of producing the baked confectionery according to any one of the items <38> to <43>, wherein a content of insoluble dietary fiber in the dough is preferably 2.2 mass % or more, more preferably 2.5 mass % or more, more preferably 4.5 mass % or more.

<45>
The method of producing the baked confectionery according to any one of the items <38> to <44>, wherein a content of insoluble dietary fiber in the dough is preferably 25 mass % or less, more preferably 17 mass % or less, more preferably 13 mass % or less, more preferably 9 mass % or less.

<46>
The method of producing the baked confectionery according to any one of the items <38> to <43>, wherein a content of insoluble dietary fiber in the dough is preferably from 2.2 to 25 mass %, more preferably from 2.5 to 17 mass %, more preferably from 4.5 mass % to 13 mass %, more preferably from 4.5 to 9 mass %.

<47>
The method of producing the baked confectionery according to any one of the items <38> to <46>, wherein the fat and oil having the melting point of 20° C. or lower preferably contains one kind or two or more kinds selected from the group consisting of soybean oil, canola oil, rapeseed oil, rice oil, corn oil, cotton seed oil, sesame oil, safflower oil, sunflower oil, olive oil, macadamia nut oil, hazelnut oil, pumpkin seed oil, walnut oil, camellia oil, tea seed oil, perilla oil, mustard oil, rice bran oil, wheat malt oil, sunflower oil and fish oil, more preferably contains one kind or two or more kinds selected from the group consisting of soybean oil, canola oil, rapeseed oil, rice oil, corn oil, cotton seed oil, sesame oil, safflower oil, sunflower oil and olive oil, more preferably contains one kind or two or more kinds selected from the group consisting of rapeseed oil and rice oil.

<48>
The method of producing the baked confectionery according to any one of the items <38> to <47>, wherein the fat and oil having the melting point of 20° C. or lower has a melting point of preferably 10° C. or lower, more preferably 4° C. or lower.

<49>
The method of producing the baked confectionery according to any one of the items <38> to <48>, wherein the fat and oil having the melting point of from 25 to 50° C. is preferably fat and oil having plasticity, more preferably one kind or two or more kinds selected from the group consisting of emulsified fat and oil such as butter, margarine and fat spread, shortening and lard, more preferably emulsified fat and oil, more preferably water-in-oil emulsified fat and oil, more preferably one kind or two or more kinds selected from butter, margarine and fat spread, more preferably one kind or two or more kinds selected from margarine and butter.

<50>
The method of producing the baked confectionery according to any one of the items <38> to <49>, wherein a ratio of saturated fatty acid in whole constituent fatty acid of the fat and oil having the melting point of from 25 to 50° C. is preferably 25 mass % or more, more preferably 30 mass % or more.

<51>
The method of producing the baked confectionery according to any one of the items <38> to <50>, wherein a ratio of saturated fatty acid in whole constituent fatty acid of the fat and oil having the melting point of from 25 to 50° C. is preferably 45 mass % or less, more preferably 35 mass % or less.

<52>
The method of producing the baked confectionery according to any one of the items <38> to <49>, wherein a ratio of saturated fatty acid in the whole constituent fatty acid of the fat and oil having the melting point of from 25 to 50° C. is preferably from 25 to 45 mass %, more preferably from 30 to 35 mass %.

<53>
The method of producing the baked confectionery according to any one of the items <50> to <52>, wherein the saturated fatty acid is preferably one kind or two or more kinds selected from lauric acid, myristic acid, palmitic acid, stearic acid, arachic acid and behenic acid.

<54>
The baked confectionery according to any one of the items <38> to <53>, wherein a ratio of palmitic acid in whole constituent fatty acid of the fat and oil having the melting point of from 25 to 50° C. is preferably from 10 to 20 mass %, and a ratio of stearic acid in the whole constituent fatty acid in the fat and oil having the melting point of from 25 to 50° C. is preferably from 5 to 20 mass %.

<55>
The method of producing the baked confectionery according to any one of the items <38> to <54>, wherein a melting point of the fat and oil having the melting point of from 25 to 50° C. is preferably from 25 to 45° C., more preferably from 25 to 40° C.

<56>
The method of producing the baked confectionery according to any one of the items <38> to <55>, wherein the D'/C' is preferably from 1/5 to 7/1, more preferably from 1/3 to 5/1.

<57>
The method of producing the baked confectionery according to any one of the items <38> to <56>, wherein the fat and oil having the melting point of 20° C. or lower and the fat and oil having the melting point of from 25 to 50° C. are blended in, in a total amount of preferably from 20 to 60 parts by mass, more preferably from 30 to 60 parts by mass, with respect to 100 parts by mass of a total blending amount of the wheat flour and the insoluble dietary fiber-containing powder.

<58>
The method of producing the baked confectionery according to any one of the items <38> to <57>, wherein, in the dough, a ratio of unsaturated fatty acid in whole fatty acid constituting total fat and oil composed of the fat and oil having the melting point of 20° C. or lower and the fat and oil having the melting point of from 25 to 50° C. is preferably 42 mass % or more, more preferably 44 mass % or more, more preferably 49 mass % or more.

<59>
The method of producing the baked confectionery according to any one of the items <38> to <58>, wherein, in the dough, a ratio of unsaturated fatty acid in whole fatty acid constituting total fat and oil composed of the fat and oil having the melting point of 20° C. or lower and the fat and oil having the melting point of from 25 to 50° C. is preferably 86 mass % or less, more preferably 84 mass % or less, more preferably 82 mass % or less.

<60>

The method of producing the baked confectionery according to any one of the items <38> to <59>, wherein, in the dough, a ratio of unsaturated fatty acid in whole fatty acid constituting total fat and oil composed of the fat and oil having the melting point of 20° C. or lower and the fat and oil having the melting point of from 25 to 50° C. is preferably from 42 to 86 mass %, more preferably 44 to 84 mass %, more preferably 49 to 82 mass %.

<61>

The method of producing the baked confectionery according to any one of the items <58> to <60>, wherein the unsaturated fatty acid is one kind or two or more kinds selected from myristoleic acid, pentadecene acid, palmitoleic acid, margaroleic acid, oleic acid, linolic acid, linoleic acid, gadoleic acid, eicosadienoic acid, arachidonic acid, erucic acid and docosadienoic acid.

<62>

The method of producing the baked confectionery according to any one of the items <38> to <61>, wherein, in the dough, a total content of the fat and oil having the melting point of 20° C. or lower and the fat and oil having the melting point of from 25 to 50° C. is preferably from 11 to 35 mass %, more preferably 12 to 32 mass %, more preferably 13 to 30 mass %.

<63>

The method of producing the baked confectionery according to any one of the items <38> to <62>, wherein, in the dough, a content of the fat and oil having the melting point of 20° C. or lower is preferably 1.3 mass % or more, more preferably 1.5 mass % or more, more preferably 2.5 mass % or more, more preferably 4 mass % or more, more preferably 6.5 mass % or more, more preferably 9 mass % or more.

<64>

The method of producing the baked confectionery according to any one of the items <38> to <63>, wherein, in the dough, a content of the fat and oil having the melting point of 20° C. or lower is preferably 30 mass % or less, more preferably 27 mass % or less, more preferably 25 mass % or less, more preferably 23 mass % or less, more preferably 21 mass % or less.

<65>

The method of producing the baked confectionery according to any one of the items <38> to <62>, wherein, in the dough, a content of the fat and oil having the melting point of 20° C. or lower is preferably from 1.3 to 30 mass %, more preferably from 2.5 to 27 mass %, more preferably from 4 to 25 mass %, more preferably from 6.5 to 23 mass %, more preferably from 9 to 21 mass %.

<66>

The method of producing the baked confectionery according to any one of the items <38> to <65>, wherein the gliadin content in the dough is preferably 2.3 mass % or more, more preferably 2.7 mass % or more, more preferably 2.9 mass % or more.

<67>

The method of producing the baked confectionery according to any one of the items <38> to <66>, wherein the gliadin content in the dough is preferably 4.0 mass % or less, more preferably 3.7 mass % or less.

<68>

The method of producing the baked confectionery according to any one of the items <38> to <65>, wherein the gliadin content in the dough is preferably from 2.3 to 4.0 mass %, more preferably from 2.7 to 3.7 mass %, more preferably 2.9 to 3.7 mass %.

<69>

The method of producing the baked confectionery according to any one of the items <38> to <68>, wherein an amount of a saccharide blended in the dough is preferably from 1 to 50 parts by mass, more preferably 1 to 30 parts by mass, more preferably from 1 to 20 parts by mass, with respect to 100 parts by mass of a total amount of the wheat flour and the insoluble dietary fiber-containing powder blended in the dough.

<70>

The method of producing the baked confectionery according to any one of the items <38> to <69>, wherein an amount of an egg blended in the dough is preferably from 5 to 50 parts by mass, more preferably from 5 to 30 parts by mass, more preferably from 5 to 20 parts by mass, with respect to 100 parts by mass of a total amount of the wheat flour and the insoluble dietary fiber-containing powder blended in the dough.

<71>

The method of producing the baked confectionery according to any one of the items <38> to <70>, wherein the baked confectionery is preferably one kind or two or more kinds selected from the group consisting of a biscuit, a cookie, a cracker, a hardtack, a pretzel, a pie, cut bread and shortbread, more preferably one kind or two or more kinds selected from the group consisting of a cookie, a biscuit, shortbread and a cracker.

EXAMPLES

The present invention will be described in more detail based on the following examples, but the present invention is not intended to be limited thereto.

[Measurement of Insoluble Dietary Fiber]

An amount of insoluble dietary fiber was measured by the modified Prosky method described in AOAC Method 991.42. Specifically the amount was measured by the following method.

A sample was processed using a homogenizer, and then sieved using a 10-mesh sieve and adjusted to a particle size of 2 mm or less. Then, 125 mL of petroleum ether was added to 5 g of a powder sample, and the resultant mixture was allowed to stand for 15 minutes while the mixture was occasionally stirred, and then centrifuged for 10 minutes at 2,150 G, and a supernatant was poured into a glass filter G-3. Further, similar operation was repeated twice, and finally a total amount was poured into the glass filter, a residue was air-dried, and then the resultant defatted sample was weighed. Then, 1 g of defatted sample was collected into to a 500 mL-volume tall beaker, 50 mL of 0.08M phosphate buffer solution having pH 6.0, and 0.1 mL of thermostable α-amylase sold by NovoZymes A/S under a trade name: Termacyl 120 L were added thereto. The resultant mixture was allowed to stand in a water bath at 95° C. for 30 minutes while the mixture was shaken at an interval of 5 minutes, and allowed to cool for 10 minutes at room temperature, and then 0.275M sodium hydroxide solution was added thereto and adjusted to pH 7.5. Then, 0.1 mL of protease, manufactured by Sigma-Aldrich Corporation, at a concentration of 50 mg/mL prepared by dissolving the protease into 0.08M phosphate buffer solution adjusted to pH 6.0 was added thereto. Activity of the added protease was 500 U/mL. Then, the resultant mixture was shaken at 60° C. for 30 minutes, allowed to cool at room temperature for 10 minutes, and then adjusted to pH 4.3 using 0.325M hydrochloric acid.

Then, 0.1 mL of amyloglucosidase sold under a trade name: Amyloglucosidase solution from *Aspergillus niger* from Sigma-Aldrich Corporation was added thereto, and the resultant mixture was shaken at 60° C. for 30 minutes. Filtration was made using a crucible type glass 2G2, a product obtained by drying a residue at 105° C. overnight was weighed, and taken as an amount of insoluble dietary fiber. A content of the insoluble dietary fiber in a baked confectionery was calculated based on this amount of insoluble dietary fiber.

[Measurement of Gliadin]

A gliadin amount was measured using a Morinaga FAS-PEK milk measurement kit (gliadin) by the following method.

A sample was milled using a mixer, and homogenized. Then, 1 g of homogenized sample was taken to a 50 mL-volume centrifuging tube made of polypropylene, 19 mL of specimen extraction liquid attached to the measurement kit was added thereto, and the resultant mixture was well shaken and mixed, and then shaken for 12 hours or more at a condition of 90 to 110 double strokes/min, room temperature, and a shaking width of about 3 cm. An extract was adjusted to the vicinity of neutrality, that is, pH 6 to 8, centrifuged at 3,000 rpm at room temperature for 20 minutes to fractionate a supernatant. This supernatant was diluted 20 times using a specimen diluent I attached to the measurement kit, and further, thus obtained 20 times-diluted sample was diluted 160,000 times to 3,200,000 times by using a specimen diluent II, and one in which a gliadin concentration fell within a calibration curve was taken as a solution for measurement. The calibration curve was prepared in the range from 0.23 ng/mL to 15.0 ng/mL in the gliadin concentration prepared by using gliadin, from wheat (SIGMA).

An antibody immobilized plate attached to the measurement kit was returned to room temperature, and the solution for measurement was added to each well by 100 µL, and then a lid was placed thereon and left to stand at room temperature for 1 hour. A solution in each well was completely removed, and each well was cleaned 6 times using a 300 µL of cleaning solution for each well. An enzyme-labeled anti-gliadin antibody solution attached to the measurement kit was dispensed by 100 µL for each well. A lid was placed thereon and left to stand at room temperature for 30 minutes, and then a solution in each well was completely removed. Each well was cleaned 6 times using a 300 µL cleaning solution for each well, and an enzyme substrate solution attached to the measurement kit was dispensed by 100 µL for each well. A lid was placed thereon and left to stand at room temperature for 10 minutes under shading from light, a reaction stopper attached to the measurement kit was dispensed by 100 µL for each well. Absorbance was measured under conditions of dominant wavelength of 450 nm, complementary wavelength of 595 nm using a plate reader to determine the gliadin concentration in the specimen based on a standard curve prepared from simultaneously measured absorbance of a standard solution.

[Production Example] Production of Baked Confectionery

Each ingredient was blended in in an amount described in Tables 1 and 2 shown below to prepare dough, and the dough was baked to produce baked confectionery of Present Inventions 1 to 15 and Comparative Products 1 to 12. A specific production method is described in detail below.

In HOBART mixer N50 MIXER manufactured by HOBART GmbH, margarine 1 (trade name: Cherica Gold E, melting point: 40° C.) manufactured by Kao Corporation, margarine 2 (trade name: Nation PV, melting point: 28° C.) manufactured by Kao Corporation, butter (melting point: 30° C.) sold under a trade name: Yotsuba butter (unsalted) from Yotsuba Milk Products Co., Ltd., rapeseed oil (melting point: 4° C. or lower) manufactured by the Nisshin Oillio Group, Ltd., rice oil (melting point: 4° C. or lower) manufactured by Tsuno Co., Ltd. and sugar (trade name: Refined Superfine Sugar ST) manufactured by Dai-Nippon Meiji Sugar Co., Ltd. were put after being weighed, and the resultant mixture was subjected to mixing at a low speed for 30 seconds, and then at a medium speed for 6 minutes.

Further, while the resultant mixture was stirred at a low speed for 30 seconds, whole hen's egg beaten was added thereto in 3 parts. After a first part of beaten egg was added thereto, the resultant mixture was stirred at a low speed for 30 seconds, and subsequently, a second part of beaten egg was added thereto, and the resultant mixture was stirred at a low speed for 30 seconds. After oil adhered to a wall of the mixer was scraped off, a remaining egg was added thereto, and the resultant mixture was stirred at a low speed for 30 seconds, and further stirred at a medium speed for 1 minute until a uniform cream state was formed.

Subsequently, wheat flour (Violet) manufactured by Chiba Flour Milling Co., Ltd., wheat bran (trade name: Wheat Bran DF, insoluble dietary fiber content: 43.4 mass %) manufactured by Nisshin Pharma Inc., dry soybean pulp powder (insoluble dietary fiber content: 11.5 mass %) manufactured by Healthy Company and wheat starch (trade name: HS-425, manufactured by Chiba Flour Milling Co., Ltd.) were blended in, and the resultant mixture was stirred at a low speed for 60 seconds.

Then, 18 g of dough obtained as described above was packed into rectangular baking pans, set them in line on a top plate on which a release paper was placed, and six holes were punctured on a surface using a bamboo skewer. As the baking pan, one made of metal and having a dimension of vertical×horizontal×height: 70 mm×20 mm×15 mm was used.

Subsequently, baking was performed under the following baking conditions.

Baking temperature: upper flame 150° C./lower flame 150° C.

Baking time: 50 minutes

Moisture contents in all of the baked confectionery after being baked were within the range of 5 to 20 mass %.

The following test was conducted using baked confectionery after elapse of one day at room temperature from baking.

Test Example 1

With regard to the baked confectionery produced in the above-described Production Example, hardness, a rough feeling sensed on a tongue, flavor (degree of foreign taste) and sweetness when the based confectionery was eaten were evaluated by a relative evaluation according to evaluation criteria shown below by using the baked confectionery of Comparative Product 1 as a reference. An evaluation numerical value was determined upon consultation of three specialist panels.

The results are shown in Tables 1 and 2 below.

—Evaluation Criteria of Hardness—

10: Tenderest in comparison with Comparative Product 1, and very soft in food texture.

9: Much tenderer than Comparative Product 1, and much softer in food texture.

8: Relatively tenderer than Comparative Product 1, and significantly softer in food texture.
7: Moderately tenderer than Comparative Product 1, and softer in food texture.
6: Slightly softer than Comparative Product 1, and slightly softer in food texture.
5: Hardness equivalent to hardness of Comparative Product 1.
4: Slightly harder in food texture than Comparative Product 1.
3: Moderately harder in food texture than Comparative Product 1.
2: Much harder in food texture than Comparative Product 1.
1: Very hard in food texture in comparison with Comparative Product 1.
—Evaluation Criteria of Rough Feeling—
10: Lowest in rough food texture in comparison with Comparative Product 1.
9: Much lower in rough food texture than Comparative Product 1.
8: Significantly lower in rough food texture than Comparative Product 1.
7: Relatively lower in rough food texture than Comparative Product 1.
6: Slightly lower in rough food texture than Comparative Product 1.
5: Rough food texture equivalent to rough food texture of Comparative Product 1.
4: Slightly higher in rough food texture than Comparative Product 1.
3: Relatively higher in rough food texture than Comparative Product 1.
2: Significantly higher in rough food texture than Comparative Product 1.
1: Much higher in rough food texture than Comparative Product 1.
—Evaluation Criteria of Flavor—
10: Not sensed in foreign taste in comparison with Comparative Product 1.
9: Insignificant foreign taste in comparison with Comparative Product 1.
8: Significantly suppressed in foreign taste in comparison with Comparative Product 1.
7: Relatively suppressed in foreign taste in comparison with Comparative Product 1.
6: Slightly suppressed in foreign taste in comparison with Comparative Product 1.
5: Sensed in foreign taste equivalent to foreign taste of Comparative Product 1.
4: Slightly stronger in foreign taste than Comparative Product 1.
3: Relatively stronger in foreign taste than Comparative Product 1.
2: Significantly stronger in foreign taste than Comparative Product 1.
1: Much stronger in foreign taste than Comparative Product 1.

Here, "foreign taste" means the flavor originating from bran, soybean pulp or the like, that is, originating from an ingredient not ordinarily mixed in standard baked confectionery. In other words, "suppressed in foreign taste" means being closer to taste of the standard baked confectionery.
—Evaluation Criteria of Sweetness—
10: Sweetness markedly apparent in comparison with Comparative Product 1.
9: Sweetness significantly apparent in comparison with Comparative Product 1.
8: Sweetness moderately apparent in comparison with Comparative Product 1.
7: Sweetness relatively apparent in comparison with Comparative Product 1.
6: Sweetness slightly apparent in comparison with Comparative Product 1.
5: Sweetness equivalent to sweetness of Comparative Product 1.
4: Somewhat masked in sweetness in comparison with Comparative Product 1.
3: Relatively masked in sweetness in comparison with Comparative Product 1.
2: Significantly masked in sweetness in comparison with Comparative Product 1.
1: Insignificant sweetness in comparison with Comparative Product 1.

Test Example 2

With regard to the baked confectionery produced in the above-described Production Example, penetration strength was measured by the measuring method shown below.

The penetration strength of the baked confectionery was measured using EZ-test manufactured by Shimadzu Corporation. Measurement conditions are shown below.
Test mode: texture
Test type: compression
Load cell capacity: 100 N
Control operation: down
Control: stroke
Test speed: 300 mm/min
Test specimen shape: flat plate
Data processing item: cutting strength H
As an upper compression tool, P/N346-51813-02 was used.

A baked confectionery was placed on a center of a platform having a hole with 6 cm in a diameter such that both ends were balanced, the upper compression tool was set on an upper surface of the baked confectionery, and the cutting strength H, namely, the penetration strength was measured under the above-described conditions. A unit of the penetration strength is N, and a lower limit of quantitation is 0.4N.

The results are shown in Tables 1 and 2 below.

TABLE 1

| | | | Present invention 1 | Present invention 2 | Present invention 3 | Present invention 4 | Present invention 5 | Present invention 6 | Present invention 7 | Present invention 8 |
|---|---|---|---|---|---|---|---|---|---|---|
| Blend (parts by mass) | Fat and oil having melting point of from 25 to 50° C. | Margarine 1 | 8.3 | 16.7 | 25 | 29.2 | 4.2 | 8.3 | 8.3 | 6.7 |
| | | Margarine 2 | — | — | — | — | — | — | — | — |
| | | Butter | — | — | — | — | — | — | — | — |
| | Fat and oil having melting point of 20° C. or lower | Rapeseed oil | 25 | 16.7 | 8.3 | 4.2 | 29.2 | 25 | 25 | 13.3 |
| | | Rice oil | — | — | — | — | — | — | — | — |

TABLE 1-continued

|  |  |  | Present invention 1 | Present invention 2 | Present invention 3 | Present invention 4 | Present invention 5 | Present invention 6 | Present invention 7 | Present invention 8 |
|---|---|---|---|---|---|---|---|---|---|---|
|  | Saccharide | Superfine Sugar | 20 | 20 | 20 | 20 | 20 | 20 | 20 | 20 |
|  | Egg | Whole egg | 13.3 | 13.3 | 13.3 | 13.3 | 13.3 | 13.3 | 13.3 | 13.3 |
|  | Wheat flour | Weak flour | 66.7 | 66.7 | 66.7 | 66.7 | 66.7 | 80 | 50 | 66.7 |
|  | Insoluble dietary fiber-containing powder | Wheat bran | 33.3 | 33.3 | 33.3 | 33.3 | 33.3 | 20 | 50 | 33.3 |
|  |  | Soybean pulp | — | — | — | — | — | — | — | — |
|  | Wheat starch | Wheat starch | — | — | — | — | — | — | — | — |
| Content in dough (mass %) | Insoluble dietary fiber |  | 8.67 | 8.67 | 8.67 | 8.67 | 8.67 | 5.21 | 13.03 | 9.43 |
|  | Total amount of fat and oil |  | 19.99 | 20.04 | 19.99 | 20.04 | 20.04 | 19.99 | 19.99 | 13.05 |
|  | Fat and oil having melting point of 20° C. or lower |  | 15.01 | 10.02 | 4.98 | 2.52 | 17.52 | 15.01 | 15.01 | 8.68 |
|  | Gliadin |  | 3.36 | 3.36 | 3.36 | 3.36 | 3.36 | 3.63 | 3.04 | 3.66 |
|  | B'/A' |  | 2.00 | 2.00 | 2.00 | 2.00 | 2.00 | 4.00 | 1.00 | 2.00 |
|  | D'/C' |  | 3.01 | 1.00 | 0.33 | 0.14 | 6.95 | 3.01 | 3.01 | 1.99 |
| Content in baked confectionery (mass %) | Insoluble dietary fiber |  | 9.95 | 9.94 | 9.95 | 9.94 | 9.94 | 5.97 | 14.94 | 10.81 |
|  | Total amount of fat and oil |  | 22.92 | 22.98 | 22.92 | 22.98 | 22.98 | 22.92 | 22.92 | 14.96 |
|  | Fat and oil having melting point of 20° C. or lower |  | 17.21 | 11.49 | 5.71 | 2.89 | 20.09 | 17.21 | 17.21 | 9.95 |
|  | Gliadin |  | 3.86 | 3.86 | 3.86 | 3.86 | 3.86 | 4.16 | 3.48 | 4.19 |
|  | B/A |  | 2.00 | 2.00 | 2.00 | 2.00 | 2.00 | 4.00 | 1.00 | 2.00 |
|  | D/C |  | 3.01 | 1.00 | 0.33 | 0.14 | 6.95 | 3.01 | 3.01 | 1.99 |
| Sensory evaluation | Hardness |  | 9 | 8 | 6 | 5 | 8 | 7 | 9 | 7 |
|  | Flavor |  | 7 | 6 | 6 | 6 | 7 | 9 | 5 | 6 |
|  | Rough feeling |  | 7 | 6 | 6 | 5 | 6 | 8 | 5 | 6 |
|  | Sweetness |  | 7 | 7 | 6 | 6 | 6 | 8 | 5 | 5 |
| Measurement value | Penetration strength (N) |  | 22.6 | 26.7 | 36.1 | 37.3 | 24.9 | 30.1 | 21.4 | 27.2 |

|  |  |  | Present invention 9 | Present invention 10 | Present invention 11 | Present invention 12 | Present invention 13 | Present invention 14 | Present invention 15 |
|---|---|---|---|---|---|---|---|---|---|
| Blend (parts by mass) | Fat and oil having melting point of from 25 to 50° C. | Margarine 1 | 8.3 | 13.3 | 20 | 8.3 | 8.3 | — | — |
|  |  | Margarine 2 | — | — | — | — | — | 8.3 | — |
|  |  | Butter | — | — | — | — | — | — | 8.3 |
|  | Fat and oil having melting point of 20° C. or lower | Rapeseed oil | 16.7 | 26.7 | 40 | — | 25 | 25 | 25 |
|  |  | Rice oil | — | — | — | 25 | — | — | — |
|  | Saccharide | Superfine Sugar | 20 | 20 | 20 | 20 | 20 | 20 | 20 |
|  | Egg | Whole egg | 13.3 | 13.3 | 13.3 | 13.3 | 13.3 | 13.3 | 13.3 |
|  | Wheat flour | Weak flour | 66.7 | 66.7 | 66.7 | 66.7 | 66.7 | 66.7 | 66.7 |
|  | Insoluble dietary fiber-containing powder | Wheat bran | 33.3 | 33.3 | 33.3 | 33.3 | — | 33.3 | 33.3 |
|  |  | Soybean pulp | — | — | — | — | 33.3 | — | — |
|  | Wheat starch | Wheat starch | — | — | — | — | — | — | — |
| Content in dough (mass %) | Insoluble dietary fiber |  | 9.13 | 8.34 | 7.48 | 8.67 | 2.30 | 8.67 | 8.67 |
|  | Total amount of fat and oil |  | 15.79 | 23.08 | 31.04 | 19.99 | 19.99 | 19.99 | 19.99 |
|  | Fat and oil having melting point of 20° C. or lower |  | 10.55 | 15.41 | 20.69 | 15.01 | 15.01 | 15.01 | 15.01 |
|  | Gliadin |  | 3.54 | 3.23 | 2.90 | 3.36 | 2.97 | 3.54 | 3.54 |
|  | B'/A' |  | 2.00 | 2.00 | 2.00 | 2.00 | 2.00 | 2.00 | 2.00 |
|  | D'/C' |  | 2.01 | 2.01 | 2.00 | 3.01 | 3.01 | 3.01 | 3.01 |
| Content in baked confectionery (mass %) | Insoluble dietary fiber |  | 10.47 | 9.56 | 8.57 | 9.95 | 2.64 | 9.95 | 9.95 |
|  | Total amount of fat and oil |  | 18.11 | 26.47 | 35.60 | 22.92 | 22.92 | 22.92 | 22.92 |
|  | Fat and oil having melting point of 20° C. or lower |  | 12.10 | 17.67 | 23.73 | 17.21 | 17.21 | 17.21 | 17.21 |
|  | Gliadin |  | 4.06 | 3.71 | 3.33 | 3.86 | 3.41 | 4.06 | 4.06 |
|  | B/A |  | 2.00 | 2.00 | 2.00 | 2.00 | 2.00 | 2.00 | 2.00 |
|  | D/C |  | 2.01 | 2.01 | 2.00 | 3.01 | 3.01 | 3.01 | 3.01 |
| Sensory evaluation | Hardness |  | 7 | 8 | 9 | 8 | 8 | 9 | 9 |
|  | Flavor |  | 6 | 7 | 8 | 6 | 6 | 6 | 6 |
|  | Rough feeling |  | 6 | 7 | 7 | 5 | 7 | 7 | 7 |
|  | Sweetness |  | 5 | 6 | 5 | 5 | 6 | 7 | 7 |
| Measurement value | Penetration strength (N) |  | 23.5 | 22.3 | 7.8 | 23.7 | 16.5 | 24.3 | 26.3 |

TABLE 2

|  |  |  | Comparative Product 1 | Comparative Product 2 | Comparative Product 3 | Comparative Product 4 | Comparative Product 5 | Comparative Product 6 |
|---|---|---|---|---|---|---|---|---|
| Blend (parts by mass) | Fat and oil having melting point of from 25 to 50° C. | Margarine 1 | 33.3 | — | 30.3 | 2 | 8.3 | 5 |
|  |  | Margarine 2 | — | — | — | — | — | — |
|  |  | Butter | — | — | — | — | — | — |
|  | Fat and oil having melting point of 20° C. or lower | Rapeseed oil | — | 33.3 | 3 | 31.3 | 25 | 10 |
|  |  | Rice oil | — | — | — | — | — | — |
|  | Saccharide | Superfine Sugar | 20 | 20 | 20 | 20 | 20 | 20 |
|  | Egg | Whole egg | 13.3 | 13.3 | 13.3 | 13.3 | 13.3 | 13.3 |
|  | Wheat flour | Weak flour | 66.7 | 66.7 | 66.7 | 66.7 | 33.3 | 66.7 |
|  | Insoluble dietary fiber-containing powder | Wheat bran | 33.3 | 33.3 | 33.3 | 33.3 | 66.7 | 33.3 |
|  |  | Soybean pulp | — | — | — | — | — | — |
|  | Wheat starch | Wheat starch | — | — | — | — | — | — |
| Content in dough (mass %) | Insoluble dietary fiber |  | 8.67 | 8.67 | 8.67 | 8.67 | 17.38 | 9.75 |
|  | Total amount of fat and oil |  | 19.99 | 19.99 | 19.99 | 19.99 | 19.99 | 10.11 |
|  | Fat and oil having melting point of 20° C. or lower |  | 0.00 | 19.99 | 1.80 | 18.79 | 15.01 | 6.74 |
|  | Gliadin |  | 3.36 | 3.36 | 3.36 | 3.36 | 2.71 | 3.78 |
|  | B'/A' |  | 2.00 | 2.00 | 2.00 | 2.00 | 0.50 | 2.00 |
|  | D'/C' |  | 0.00 | — | 0.10 | 15.65 | 3.01 | 2.00 |
| Content in baked confectionery (mass %) | Insoluble dietary fiber |  | 9.95 | 9.95 | 9.95 | 9.95 | 19.93 | 11.18 |
|  | Total amount of fat and oil |  | 22.92 | 22.92 | 22.92 | 22.92 | 22.92 | 11.60 |
|  | Fat and oil having melting point of 20° C. or lower |  | 0.00 | 22.92 | 2.07 | 21.55 | 17.21 | 7.73 |
|  | Gliadin |  | 3.86 | 3.86 | 3.86 | 3.86 | 3.11 | 4.34 |
|  | B/A |  | 2.00 | 2.00 | 2.00 | 2.00 | 0.50 | 2.00 |
|  | D/C |  | 0.00 | — | 0.10 | 15.65 | 3.01 | 2.00 |
| Sensory evaluation | Hardness |  | 5 | — | 5 | — | 8 | — |
|  | Flavor |  | 5 | — | 5 | — | 2 | — |
|  | Rough feeling |  | 5 | — | 5 | — | 2 | — |
|  | Sweetness |  | 5 | — | 5 | — | 4 | — |
| Measurement value | Penetration strength (N) |  | 39.4 | — | 39 | — | 25.9 | — |

|  |  |  | Comparative Product 7 | Comparative Product 8 | Comparative Product 9 | Comparative Product 10 | Comparative Product 11 | Comparative Product 12 |
|---|---|---|---|---|---|---|---|---|
| Blend (parts by mass) | Fat and oil having melting point of from 25 to 50° C. | Margarine 1 | 25 | 33.3 | 8.3 | 8.3 | — | — |
|  |  | Margarine 2 | — | — | — | — | 33.3 | — |
|  |  | Butter | — | — | — | — | — | 33.3 |
|  | Fat and oil having melting point of 20° C. or lower | Rapeseed oil | 50 | — | 25 | 25 | — | — |
|  |  | Rice oil | — | — | — | — | — | — |
|  | Saccharide | Superfine Sugar | 20 | 20 | 20 | 20 | 20 | 20 |
|  | Egg | Whole egg | 13.3 | 13.3 | 13.3 | 13.3 | 13.3 | 13.3 |
|  | Wheat flour | Weak flour | 66.7 | 66.7 | — | 33.3 | 66.7 | 66.7 |
|  | Insoluble dietary fiber-containing powder | Wheat bran | 33.3 | — | 33.3 | 33.3 | 33.3 | 33.3 |
|  |  | Soybean pulp | — | 33.3 | — | — | — | — |
|  | Wheat starch | Wheat starch | — | — | 66.7 | 33.3 | — | — |
| Content in dough (mass %) | Insoluble dietary fiber |  | 6.94 | 2.30 | 8.67 | 8.68 | 8.67 | 8.67 |
|  | Total amount of fat and oil |  | 36.01 | 19.99 | 199.9 | 20.00 | 19.99 | 19.99 |
|  | Fat and oil having melting point of 20° C. or lower |  | 24.00 | 0.00 | 15.01 | 15.02 | 0.00 | 0.00 |
|  | Gliadin |  | 2.69 | 2.97 | 0.68 | 2.02 | 4.21 | 4.21 |
|  | B'/A' |  | 2.00 | 2.00 | — | 1.00 | 2.00 | 2.00 |
|  | D'/C' |  | 2.00 | 0.00 | 3.01 | 3.01 | 0.00 | 0.00 |
| Content in baked confectionery (mass %) | Insoluble dietary fiber |  | 7.96 | 2.64 | 9.95 | 9.95 | 9.95 | 9.95 |
|  | Total amount of fat and oil |  | 41.29 | 22.92 | 22.92 | 22.94 | 22.92 | 22.92 |
|  | Fat and oil having melting point of 20° C. or lower |  | 27.53 | 0.00 | 17.21 | 17.22 | 0.00 | 0.00 |
|  | Gliadin |  | 3.09 | 3.41 | 0.78 | 2.32 | 4.82 | 4.82 |
|  | B/A |  | 2.00 | 2.00 | — | 1.00 | 2.00 | 2.00 |
|  | D/C |  | 2.00 | 0.00 | 3.01 | 3.01 | 0.00 | 0.00 |
| Sensory evaluation | Hardness |  | 10 | 7 | 8 | 7 | 5 | 5 |
|  | Flavor |  | 7 | 4 | 3 | 4 | 5 | 5 |
|  | Rough feeling |  | 3 | 4 | 4 | 4 | 5 | 5 |
|  | Sweetness |  | 3 | 5 | 4 | 4 | 5 | 6 |
| Measurement value | Penetration strength (N) |  | 3.7 | 19.5 | 13.4 | 19.5 | 43.5 | 38.8 |

As shown in Table 2 above, Comparative Product 1 is an example in which wheat bran is used as insoluble dietary fiber-containing powder, but as fat and oil, only margarine having a melting point of from 25 to 50° C. was used, and no fat and oil having a melting point of 20° C. or lower was contained. In various kinds of sensory tests described above, this Comparative Product 1 was used as a standard product to perform a relative evaluation.

Comparative Product 2 is an example in which no fat and oil having a melting point of from 25 to 50° C. was blended in, and in this case, an egg, and the fat and oil were not homogeneously mixed, and as a result of this, dough could not be prepared. Further, Comparative Product 4 was prepared by blending in fat and oil having a melting point of from 25 to 50° C., but a ratio of the fat and oil having a melting point of 20° C. or lower was higher than the ratio defined in the present invention. In this case, in a manner similar to Comparative Product 2, dough could not be prepared.

Both of Comparative Products 3 and 8 are an examples in which a ratio of fat and oil having a melting point of from 25 to 50° C. in fat and oil was higher than the ratio defined in the present invention, and all resulted in evaluations equivalent to or lower than the evaluations of Comparative Product 1 in the flavor, the food texture and the sweetness.

Comparative Product 5 is an example in which a blending amount of wheat bran as an insoluble dietary fiber-containing powder was higher than the amount defined in the present invention, and the foreign taste and the rough feeling were strong, and the sweetness was masked.

In Comparative Product 6, a blending ratio of fat and oil having a melting point of 20° C. or lower and fat and oil having a melting point of from 25 to 50° C. was within the range defined in the present invention, but a total blending amount of the fat and oil was less than that defined in the present invention. In this case, an egg and the fat and oil were not homogeneously mixed, and as a result of this, dough could not be prepared.

In Comparative Product 7, a blending ratio of fat and oil having a melting point of 20° C. or lower and fat and oil having a melting point of from 25 to 50° C. was within the range defined in the present invention, but a total blending amount of the fat and oil was higher than that defined in the present invention. In this case, baked confectionery was inferior in the rough feeling and the sweetness.

Comparative Product 9 is an example in which wheat starch was used in place of the wheat flour, and Comparative Product 10 is an example in which a blending amount of the wheat flour was reduced and wheat starch was blended in, but both examples were inferior in all of the food texture, the flavor and the sweetness.

Comparative Product 11 was the same example as Comparative Product 1 except for using margarine, as the fat and oil having the melting point of 25° C. to 50° C., having a melting point different from the melting point of margarine used in Comparative Product 1, and Comparative Product 12 was the same example as Comparative Product 1 except for using butter in place of margarine. Both contained no fat and oil having the melting point of 20° C. or lower, and therefore was not improved in both of the food texture and the flavor in comparison with Comparative Product 1.

In contrast, while the baked confectionery of Present Inventions 1 to 15 had items advantageous over Comparative Product 1 in sensory evaluation items, the baked confectionery had no poorer evaluation items in comparison with Comparative Product 1. Moreover, penetration strength of the baked confectionery of Present Inventions 1 to 15 was lower in comparison with Comparative Product 1, and thus, the baked confectionery of Present Inventions 1 to 15 was demonstrated to be soft baked confectionery, also based on measured values using the device.

Having described our invention as related to this embodiments, it is our intention that the invention not be limited by any of the details of the description, unless otherwise specified, but rather be construed broadly within its spirit and scope as set out in the accompanying claims.

This application claims priority on Patent Application No. 2012-288635 filed in Japan on Dec. 28, 2012, which is entirely herein incorporated by reference.

The invention claimed is:

1. Baked confectionery comprising fat and oil having a melting point of 20° C. or lower and fat and oil having a melting point of from 25 to 50° C. in a total amount of 20 to 65 parts by mass, with respect to 100 parts by mass of a total amount of wheat flour and wheat bran, and satisfying (a) to (e):
   (a) a ratio of a content B of the wheat flour to a content A of the wheat bran satisfies B/A=50/50 to 80/20 in terms of a mass ratio;
   (b) a ratio of a content D of the fat and oil having the melting point of 20° C. or lower to a content C of the fat and oil having the melting point of from 25 to 50° C. satisfies D/C=1/7 to 7/1 in terms of a mass ratio;
   (c) a gliadin content in the baked confectionery is 3.2 to 4.3 mass %;
   (d) a content of insoluble dietary fiber in the baked confectionery is 5 to 15 mass %; and
   (e) a moisture content in the baked confectionery is 5 to 20 mass %
   wherein:
   the fat and oil having a melting point of 20° C. or lower comprises rapeseed oil;
   the fat and oil having a melting point of from 25 to 50° C. comprises a margarine; and
   the baked confectionery is a cookie, a biscuit, shortbread or a cracker.

2. The baked confectionery according to claim wherein a content of insoluble dietary fiber in the wheat bran is 40 mass % or more.

3. The baked confectionery according to claim 1, wherein a content of the fat and oil having a melting point of 20° C. or lower is from 1.5 to 35 mass %.

4. A method of producing baked confectionery, comprising preparing dough by blending therein at least wheat flour, wheat bran, fat and oil having a melting point of 20° C. or lower and fat and oil having a melting point of from 25 to 50° C. so as to satisfy (d) to (i) below, and baking the dough to obtain baked confectionery:
   (d) a ratio of a blending amount B' of the wheat flour to a blending amount A' of the wheat bran satisfies B'/A'=50/50 to 80/20 in terms of a mass ratio;
   (e) a ratio of a blending amount D' of the fat and oil having the melting point of 20° C. or lower to a blending amount C' of the fat and oil having the melting point of from 25 to 50° C. satisfies D'/C'=1/7 to 7/1 in terms of a mass ratio;
   (f) a total blending amount of the fat and oil having the melting point of 20° C. or lower and the fat and oil having the melting point of from 25 to 50° C. is 20 to 65 parts by mass, with respect to 100 parts by mass of a total blending amount of the wheat flour and the wheat bran;
   (g) a gliadin content in the dough is 2.9 to 4.0 mass %;
   (h) a content of insoluble dietary fiber in the dough is 4.5 to 13 mass %;

(i) a saccharide content in the dough is 1 to 20 parts by mass, with respect to 100 parts by mass of the total blending amount of the wheat flour and the wheat bran; and (j) an egg content in the dough is 5 to 20 parts by mass, with respect to 100 parts by mass of the total blending amount of the wheat flour and the wheat bran, wherein:

the fat and oil having a melting point of 20° C. or lower comprises rapeseed oil;

the fat and oil having a melting point of from 25 to 50° C. comprises a margarine; and a moisture content in the baked confectionery obtained by the method is 5 to 20 mass %.

5. The production method according to claim 4, wherein a content of the fat and oil having a melting point of 20° C. or lower in the dough is from 1.3 to 30 mass %.

6. The production method according to claim 4, wherein the baked confectionery is selected from the group consisting of a cookie, a biscuit, shortbread and a cracker.

7. Baked confectionery comprising fat and oil having a melting point of 20° C. or lower and fat and oil having a melting point of from 25 to 50° C. in a total amount of 30 to 60 parts by mass, with respect to 100 parts by mass of a total amount of wheat flour and wheat bran, and satisfying (a) to (e):

(a) a ratio of a content B of the wheat flour to a content A of the wheat bran satisfies B/A=50/50 to 80/20 in terms of a mass ratio;

(b) a ratio of a content D of the fat and oil having the melting point of 20° C. or lower to a content C of the fat and oil having the melting point of from 25 to 50° C. satisfies D/C=1/3 to 5/1 in terms of a mass ratio;

(c) a gliadin content in the baked confectionery is from 3.2 to 4.1 mass %;

(d) a content of insoluble dietary fiber in the baked confectionery is 5 to 15 mass %; and (e) a moisture content in the baked confectionery is 5 to 20 mass %, wherein:

the fat and oil having a melting point of 20° C. or lower comprises rapeseed oil;

the fat and oil having a melting point of from 25 to 50° C. comprises a margarine; and the baked confectionery is a cookie, a biscuit, shortbread or a cracker.

8. The baked confectionery according to claim 1, wherein the baked confectionary has a penetration strength of from 7.8 to 37.3 N.

9. The production method according to claim 4, wherein the baked confectionary has a penetration strength of from 7.8 to 37.3 N.

10. The baked confectionery according to claim 7, wherein the baked confectionary has a penetration strength of from 7.8 to 37.3 N.

11. The baked confectionery according to claim 1, wherein the baked confectionary has a penetration strength that is less than an otherwise-identical baked confectionary having a mass ratio of a content D of the fat and oil having the melting point of 20° C. or lower to a content C of the fat and oil having the melting point of from 25 to 50° C. (D/C) of 0.10.

12. The production method according to claim 4, wherein the baked confectionary has a penetration strength that is less than an otherwise-identical baked confectionary having a mass ratio of a blending amount D' of the fat and oil having the melting point of 20° C. or lower to a blending amount C' of the fat and oil having the melting point of from 25 to 50° C. (D/C') of 0.10.

13. The baked confectionery according to claim 7, wherein the baked confectionary has a penetration strength that is less than an otherwise-identical baked confectionary having a mass ratio of a content D of the fat and oil having the melting point of 20° C. or lower to a content C of the fat and oil having the melting point of from 25 to 50° C. (D/C) of 0.10.

* * * * *